(12) United States Patent
Mason

(10) Patent No.: US 7,699,069 B2
(45) Date of Patent: Apr. 20, 2010

(54) VALVE STATUS MONITORING

(75) Inventor: Shane Michael Mason, Hamilton (NZ)

(73) Assignee: Tyco Flow Control Keystone Hygenic Valve Division, Auckland (NZ)

( * ) Notice: Subject to any disclaimer, the term of this patent is extended or adjusted under 35 U.S.C. 154(b) by 479 days.

(21) Appl. No.: 11/570,351

(22) PCT Filed: Jul. 5, 2005

(86) PCT No.: PCT/NZ2005/000157

§ 371 (c)(1),
(2), (4) Date: Dec. 11, 2006

(87) PCT Pub. No.: WO2006/004442

PCT Pub. Date: Jan. 12, 2006

(65) Prior Publication Data

US 2008/0017824 A1 Jan. 24, 2008

(30) Foreign Application Priority Data

Jul. 5, 2004 (NZ) .................................... 533910

(51) Int. Cl.
F16K 37/00 (2006.01)
F16K 51/00 (2006.01)

(52) U.S. Cl. ............... 137/15.11; 137/312; 137/614.17; 137/614.18; 137/240

(58) Field of Classification Search ................. 137/312, 137/614.18, 614.19, 614.17, 240, 1, 15.11; 73/861.08
See application file for complete search history.

(56) References Cited

U.S. PATENT DOCUMENTS

| 4,373,545 | A | * | 2/1983 | Knappe ...................... 137/240 |
| 4,655,253 | A | * | 4/1987 | Ourensma .............. 137/614.18 |
| 4,757,834 | A | | 7/1988 | Miet |
| 4,901,751 | A | * | 2/1990 | Story et al. .................. 137/312 |
| 5,361,802 | A | * | 11/1994 | Kroll et al. ................... 137/552 |
| 5,806,554 | A | * | 9/1998 | Mieth .......................... 137/240 |
| 6,089,255 | A | * | 7/2000 | Bonnefous et al. .......... 137/312 |
| 6,098,645 | A | * | 8/2000 | Brackelmann et al. ... 137/15.01 |
| 6,230,736 | B1 | * | 5/2001 | Scheible et al. ............. 137/312 |

* cited by examiner

Primary Examiner—Kevin L Lee

(57) ABSTRACT

A valve apparatus has a valve (1), an actuator (2) and a leakage sensor (3). A body (4) of the valve has first and second valve chambers (6, 8) connected to respective valve ports (10 & 12, 14 & 16) and joined by an intermediate passage (18). The valve can be set by the actuator to any one of three valve configurations. In an 'open' configuration the intermediate passage is open to interconnect the first and second chambers. In a 'closed' configuration, the intermediate passage is closed by first and second seals (24, 26) seated at respective locations in the passage to seal respectively between the first and second chambers and a leakage chamber (28) at the portion of the intermediate passage between the two seals. In a 'cleaning' configuration one of the seals is unseated to connect a respective one of the first and second chambers to the leakage chamber, while the other seal remains seated. The leakage sensor is connected to the leakage chamber to provide a signal indicative of a leakage flow from the leakage chamber.

18 Claims, 2 Drawing Sheets

VALVE STATUS MONITORING

FIELD OF THE INVENTION

The present invention relates to an apparatus and method for monitoring the status of a fluid control valve, and in particular for monitoring an undesired flow past seals of the valve when the seals are seated or for confirming a desired flow past seals when the seals are unseated.

BACKGROUND OF THE INVENTION

Valves are routinely used to control the flow of fluids in the production and processing of many products and materials. Failure of valve seals can cause loss or contamination of product flows being controlled by the valves. It is therefore desirable to identify early failure of seals before seal leakage can reach troublesome levels or contaminate the product. The avoidance of contamination is particularly essential in the preparation of products such as foods, beverages and medicines destined for human or animal consumption, for example.

Furthermore, many products are manufactured or processed using batch production methods and the cleaning of equipment such as vessels and lines between batches to avoid cross-contamination between different products, or to avoid build-up of moulds, fungi, bacteria, and other pathogens is at least desirable, if not essential. In such situations it is desirable to be able to confirm the presence of the correct cleaning or rinsing flows through the processing plant.

U.S. Pat. No. 4,655,253 describes a shut-off valve comprising a valve housing having two chambers joined by an axial passage bounded by valve seats. A valve body has two parts which are independently movable axially in the housing. Each part carries a seal that respectively co-operates with one of the seats to close between a chamber and the associated passage. In one embodiment, a leakage detection space is provided between the seats. Fluid leaking past the seats into this space is discharged via a channel to provide a visible signal indicating the leakage and preventing intermixing of respective fluids in the two chambers.

U.S. Pat. No. 5,361,802 describes a valve block having metallic electrodes. If a valve of the block fails to seal, fluid leakage closes a circuit between electrodes to generate a signal which is processed by an analyser to trigger an alarm identifying the defective valve.

U.S. Pat. No. 5,594,162 describes a gas leak detector that is adapted for fitting about the control stem of a valve to monitor the leakage of a hydrocarbon gas from the valve.

U.S. Pat. No. 5,616,829 describes a valve with a leak detector which monitors vibrations caused by leakage through the seats or a gland/packing assembly of the valve. If leakage is detected when the valve is closed the valve is driven further in the closing direction, e.g. until the leakage, and thus the vibrations, disappear.

SUMMARY OF THE INVENTION

It is an object of the invention to provide a double seal valve with an improved valve status monitoring system. It is another object of the invention to provide an improved method of monitoring the operational status of a double seal valve.

In a first aspect, the invention may be broadly said to be a valve apparatus comprising:

(a) a valve having a valve body with first and second valve chambers connected to respective valve ports and joined by an intermediate passage, the valve being selectively configurable in:
  i. a first 'open' configuration in which the intermediate passage is open and the first and second valve chambers are interconnected by the intermediate passage,
  ii. a second 'closed' configuration in which the intermediate passage is closed by first and second seals seated at respective locations in the passage to seal respectively between the first and second valve chambers and a first leakage chamber at the portion of the intermediate passage between the two seals, or
  iii. a third 'cleaning' configuration in which one of the two seals is unseated to connect a respective one of the first and second valve chambers to the first leakage chamber, while the other of the two seals remains seated,
(b) a valve actuator adapted for selectively setting the valve to any one of the three configurations in response to respective control signals; and
(c) a flow sensor connected to the first leakage chamber and adapted to provide a flow sensor output signal that is indicative of a leakage flow from the first leakage chamber.

Preferably, the valve apparatus further comprises a valve controller having at least one signal input port to which the flow sensor output signal is connected, and the valve controller is adapted to:

provide at least one control signal to the valve actuator for setting the valve to a respective one of the three configurations, respond to the flow sensor output signal and make a comparison between the leakage flow as indicated by the flow sensor output signal and a predetermined flow from the first leakage chamber associated with the selected valve configuration, and provide a controller output signal that is responsive to the comparison and is indicative of the presence or absence of a desired valve function or an undesired valve dysfunction.

The controller output signal may be indicative of an undesired valve dysfunction when the valve is in the second 'closed' configuration, the dysfunction being a leakage flowing from either of the first or second valve chambers, past the respective first or second seals and into the first leakage chamber. Alternatively or additionally, the controller output signal may be indicative of a desired valve function when the valve is in the third 'cleaning' configuration, the desired valve function being a flow past the unseated seal from a respective valve chamber into the first leakage chamber.

The valve may have a third seal located between the first and second seals, the third seal being for sealing the first leakage chamber from the interconnected valve chambers and the interconnecting passage when the valve is in the first 'open' configuration. Preferably the controller output signal is indicative of an undesired valve dysfunction when the valve is in the first 'open' configuration, and the dysfunction is a leakage flowing past the third seal and into the first leakage chamber, from the interconnected first and second valve chambers and the interconnecting passage.

Preferably, the first and second seals may be mounted on respective first and second valve members; the first and second valve members are independently moveable relative to the valve body to effect the selected valve configuration; the valve apparatus further comprising:

a second leakage chamber between the first valve member and the body;

a fourth seal for sealing between the first valve member and the valve body, the fourth seal being located between the first valve chamber and the second leakage chamber;

a third leakage chamber between the second valve member and the valve body; and a fifth seal for sealing between the second valve member and the valve body, the fifth seal being located between the second valve chamber and the third leakage chamber; and the second and third leakage chambers are connected to the flow sensor so that leakage flowing past the fourth seal and into the second leakage chamber, or past the fifth seal and into the third leakage chamber, is directed to the flow sensor so that the flow sensor output signal can also be indicative of leakage flow past either of the fourth or fifth seals.

Preferably, the controller output signal is indicative of an undesired valve dysfunction when the valve is in the first 'open' configuration or the second 'closed' configuration, and the dysfunction is a leakage flowing from the first valve chamber and past the fourth seal into the second leakage chamber, or a leakage flowing from the second valve chamber and past the fifth seal into the third leakage chamber.

The flow sensor may have a tubular passage and a pair of annular electrodes mounted coaxially with, and spaced apart along, an electrically insulative wall of the tubular passage, the flow sensor being connected to the first leakage chamber so that the leakage flow from the first leakage chamber flows through the tubular passage and across the electrodes to provide an electrically conductive path therebetween.

In a second aspect, the invention may be broadly said to be a method of monitoring the status of a controlled valve having a valve body and first and second valve chambers connected to respective valve ports and joined by an intermediate passage, the valve being selectively configurable in:

i. a first 'open' configuration in which the intermediate passage is open and the first and second valve chambers are interconnected by the intermediate passage, ii. a second 'closed' configuration in which the intermediate passage is closed by first and second seals seated at respective locations in the passage to seal respectively between the first and second valve chambers and a first leakage chamber at the portion of the intermediate passage between the two seals, or iii. a third 'cleaning' configuration in which one of the two seals is unseated to connect a respective one of the first and second valve chambers to the first leakage chamber, while the other of the two seals remains seated, the method comprising the steps of:

(a) connecting a flow sensor to the first leakage chamber, the flow sensor thereby providing a flow sensor output signal that is indicative of a leakage flow from the first leakage chamber;

(b) receiving a valve control signal and selectively setting the valve to one or other of the three configurations in response to the received control signal;

(c) comparing the leakage flow as indicated by the flow sensor output signal with a predetermined flow from the first leakage chamber associated with the selected valve configuration, and (d) providing a comparison output signal that is responsive to the comparison and is indicative of the presence or absence of a desired valve function or an undesired valve dysfunction.

The comparison output signal provided in step (d) may be indicative of an undesired valve dysfunction when the valve is in the second 'closed' configuration, the dysfunction being a leakage flowing from either of the first or second valve chambers, past the respective first or second seals and into the first leakage chamber. Alternatively or additionally, the comparison output signal provided in step (d) may be indicative of a desired valve function when the valve is in the third 'cleaning' configuration, the desired valve function being a flow past the unseated seal from a respective valve chamber into the first leakage chamber.

Preferably, the valve has a third seal located between the first and second seals, the third seal being for sealing the first leakage chamber from the interconnected valve chambers and the interconnecting passage when the valve is in the first 'open' configuration. The comparison output signal provided by the valve controller may be indicative of an undesired valve dysfunction when the valve is in the first 'open' configuration, and the dysfunction is a leakage flowing past the third seal and into the first leakage chamber, from the interconnected first and second valve chambers and the interconnecting passage.

Preferably, the first and second seals are mounted on respective first and second valve members; the first and second valve members are independently moveable relative to the valve body to effect the selected valve configuration; the valve further comprising:

a second leakage chamber between the first valve member and the body;

a fourth seal for sealing between the first valve member and the valve body, the fourth seal being located between the first valve chamber and the second leakage chamber;

a third leakage chamber between the second valve member and the valve body; and a fifth seal for sealing between the second valve member and the valve body, the fifth seal being located between the second valve chamber and the third leakage chamber;

and the second and third leakage chambers are connected to the flow sensor so that leakage flowing past the fourth seal and into the second leakage chamber, or past the fifth seal and into the third leakage chamber, is directed to the flow sensor so that the flow sensor output signal can also be indicative of leakage flow past either of the fourth or fifth seals. The comparison output signal may be indicative of an undesired valve dysfunction when the valve is in the first 'open' configuration or the second 'closed' configuration, where the dysfunction is a leakage flowing from the first valve chamber and past the fourth seal into the second leakage chamber, or a leakage flowing from the second valve chamber and past the fifth seal into the third leakage chamber.

The flow sensor may have a tubular passage and a pair of annular electrodes mounted coaxially with, and spaced apart along, an electrically insulative wall of the tubular passage, and the flow sensor is connected to the first leakage chamber so that leakage flow from the first leakage chamber flows through the tubular passage and across the electrodes to provide an electrically conductive path therebetween.

BRIEF DESCRIPTION OF THE DRAWINGS

The above and other objects, features and advantages of the present invention will now be described in more detail with reference to preferred embodiments and by reference to the accompanying drawings in which.

DETAILED DESCRIPTION OF PREFERRED EMBODIMENTS

Figure 1:
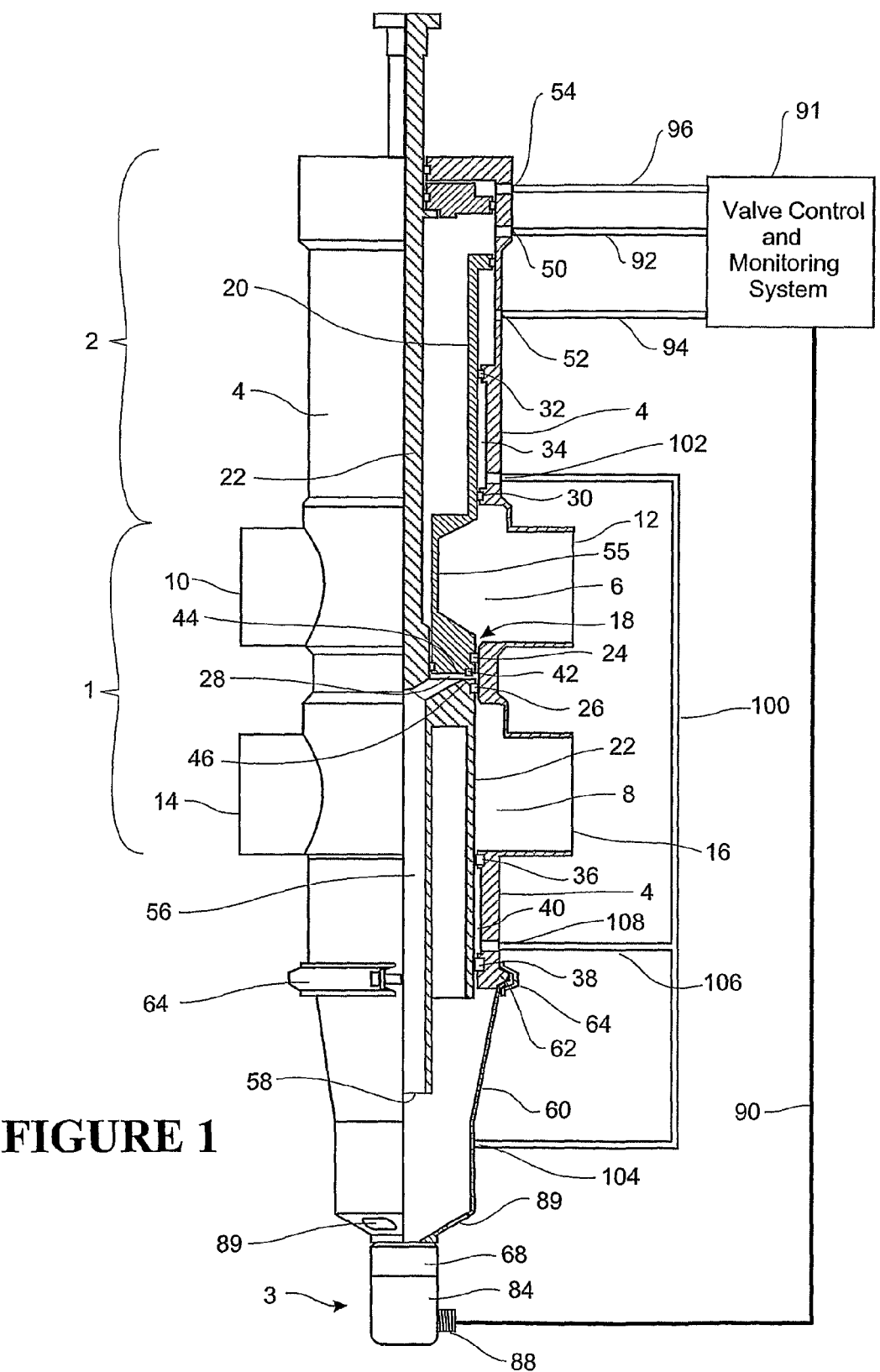
FIG. 1 shows a partly cross-sectioned view of a valve system according to one embodiment of the invention.

Throughout the drawings and description, the same or corresponding elements are shown or referred to by the same reference numerals.

Although a valve system is shown and described with a valve and actuator in a preferred vertical orientation, it is to be understood that this particular orientation has been shown and described generally for the convenience and clarity of the description, and that the invention is not limited to such an orientation.

FIG. 1 shows a partly cross-sectioned view of a valve system according to a preferred embodiment of the current invention. The valve system includes a valve 1 and integral valve actuator 2 which are shown in a one quarter cross-sectional view; the left side showing the exterior of the valve and actuator, and the right side showing a cross-sectional view as seen at a plane through the longitudinal (i.e. vertical) axis of the valve and actuator. FIG. 1 also show schematically parts of the system that are external to the valve and actuator.

The valve and actuator are generally symmetrical about the longitudinal axis, except where not appropriate (as will be noted below). A sensor 3 is fitted to the lower end of the valve.

The valve and actuator have a common body 4, a lower portion of which houses two valve chambers: a first upper valve chamber 6 and a second lower valve chamber 8. In the embodiment shown in FIG. 1, the upper valve chamber opens at a left side port 10 and a right side port 12, and the lower valve chamber opens at a left side port 14 and a right side port 16. In other embodiments the valve may have other numbers of ports, for example only one port for either or both of the upper and lower valve chambers, or more than two ports for either or both of the upper and lower valve chambers.

The two valve chambers 6, 8 are interconnected by an intermediate passage 18 which is circularly cylindrical and coaxial to the valve body.

The valve has a first valve member or plunger 20 and a second valve member or plunger 22. The plungers slide axially in the valve body 4 with the second plunger 22 sliding generally along the axis of the body and the first plunger 20 coaxial about an upper, but not uppermost, part of the first plunger.

An upper, or first, main seal 24 is carried about the outer circumference of the first plunger 20 near the lower end of that plunger. A lower, or second, main seal 26 is carried about the outer circumference of the second plunger 22 at a mid portion of that plunger. The plungers can be independently moved in an axial direction relative to the valve body 4 to seat the two main seals against the cylindrical wall of the intermediate passage 18. A first leakage chamber 28 is located between the first and second main seals 24, 26 as will be described further below.

The first plunger 20 slides in an upper pair of spaced apart circular body seals 30, 32 fitted to an inside wall of an upper portion of the valve body 4. These upper body seals 30, 32 provide a seal between the first sliding plunger 20 and the valve body 4. A second leakage chamber 34 is formed between the first plunger and the valve body 4 and between these two upper body seals 30, 32.

The second plunger 22 slides in a lower pair of spaced apart circular body seals 36, 38 fitted to an inside wall of a lower portion of the valve body 4. These lower body seals 36, 38 provide a seal between the second sliding plunger 22 and the valve body 4. A third leakage chamber 40 is formed between the second plunger and the valve body 4 and between these two lower body seals 36, 38.

A third main valve seal 42 is fitted into a lower end face 44 of the first plunger 20. This third main valve seal can be seated against an upward-facing shoulder 46 of the second plunger 22 to close an outer perimeter of a portion of the first leakage chamber 28 between the end face 44 and the shoulder 46.

The valve is shown in FIG. 1 in a 'closed' configuration in which both the first and second main valve seals 24, 26 are seated in the intermediate passage 18 to isolate the first and second valve chambers 6, 8 from one another and from the first leakage chamber 28 which is sealed from the first valve chamber 6 by the first main valve seal 24, and from the second valve chamber 8 by the second main valve seal 26. With the first leakage chamber 28 intervening between the two valve chambers, any leakage past either of the main seals 24, 26 flows into the leakage chamber 28 which, being vented to atmosphere as will be explained further below, thereby prevents cross-contamination between the valve chambers when the valve is in the 'closed' configuration shown in FIG. 1. This 'closed' configuration is the quiescent valve configuration.

The upper end of the valve body 4 houses the valve actuator 2. In the embodiment shown in FIG. 1, the valve is actuated by application of pneumatic or hydraulic pressure to control ports 50, 52, 54, to control the axial sliding movement of the two plungers 20, 22, as will now be discussed. However, the valve may be actuated by other motive means, for example by electrically driven motors. The two valve plungers are biased by helical springs, not shown, which return the plungers to the quiescent 'closed' configuration upon release of fluid pressure applied to the control ports.

When pressure is applied to first control port 50, the first plunger 20 is pushed downward causing the third seal 42 in the lower end face 44 of the first plunger to seat against the upward-facing shoulder 46 of the second plunger 22 and thereby seal around the outer perimeter of the first leakage chamber 28. Further downward movement of the first plunger increases the seating pressure of the third seal on the second plunger and thereby drives the second plunger downward to unseat the second main seal 26 from the lower end of the intermediate passage 18. Further downward movement of the first plunger drives the first main seal 24 down through the intermediate passage, eventually unseating the first main seal 24 from the lower end of the intermediate passage and thereby putting the valve into an 'open' configuration in which the first and second valve chambers 6, 8 are freely interconnected by the intermediate passage 18. In this 'open' configuration, a narrowed waist 55 near the lower end of the first plunger 20 spans the intermediate passage 18 to provide the open interconnection between the first and second valve chambers 6, 8.

As noted above, the valve returns to the quiescent 'closed' configuration when the pressure applied to the first control port 50 is released.

When pressure is applied to second control port 52, the first plunger 20 is lifted upward causing the first main seal 24 to be unseated from the upper end of the intermediate passage 18, and thereby connecting the first valve chamber 6 with the first leakage chamber 28. This action does not move the second plunger 22 from its quiescent position, so the second main seal 26 remains seated in the intermediate passage 18. In this first 'cleaning' configuration, a cleaning fluid flowing through the first valve chamber flows past the first main seal 24 and the third seal 42 to flow into the first leakage chamber 28. In this way the first valve chamber 6 and these two seals 24, 42 can be washed with a cleaning fluid while the second valve chamber 8 remains sealed by the second main seal 26 from the cleaning fluid.

Similarly, when pressure is applied to third control port 54, the second plunger 22 is pushed downward causing the second main seal 26 to be unseated from the lower end of the intermediate passage 18, and thereby connecting the second valve chamber 8 with the first leakage chamber 28. This action does not move the first plunger 22 from its quiescent position, so the first main seal 24 remains seated in the intermediate passage 18. In this second 'cleaning' configuration, a cleaning fluid flowing through the second valve chamber flows past the second main seal 26 and the third seal 42 to flow into the first leakage chamber 28. In this way the second valve chamber 8 and these two seals 26, 42 can be washed with a cleaning fluid while the first valve chamber 6 remains sealed by first main seal 24 from the cleaning fluid.

The first leakage chamber 28 is vented to atmosphere by an axial drainage bore 56 in the lower part of the second valve plunger 22. This lower end of the drainage bore terminates at a first leakage port 58. Leakage flowing into the first leakage chamber 28 (for example past the first or second main valve seals 24, 26 when the valve is in the 'closed configuration, or past the third seal 42 when the valve is in the 'open' configuration, or the cleaning fluid flushed past the respective main seal 24, 26 and the third seal 42 in either the first or second 'cleaning' configurations) flows down the drainage bore 56 to pour from the bore at the first leakage port 58.

The valve plungers, and the cavities of the valve body in which they slide, are preferably circular in transverse cross-section. Similarly, the seals are also circular. In general, as noted above, the valve and actuator are generally circularly symmetrical about the longitudinal axis. Exceptions include the valve ports 10, 12, 14 and 16, and the control ports 50, 52, 54, which are generally aligned in respective radial directions, and which may be conveniently provided as threaded bores aligned along a radius to the longitudinal valve axis.

In the preferred embodiment shown in FIG. 1, a hollow funnel 60 has, at its upper edge, an outwardly-extending flange by which the funnel is attached to a circumferential ridge 62 around the lower end of the valve body 4 by a clamp 64. The funnel is sufficiently elongate to accommodate the first leakage port 58 when the second plunger 22 is in its lowermost position, such as when the valve is in the 'open' configuration.

Figure 2:
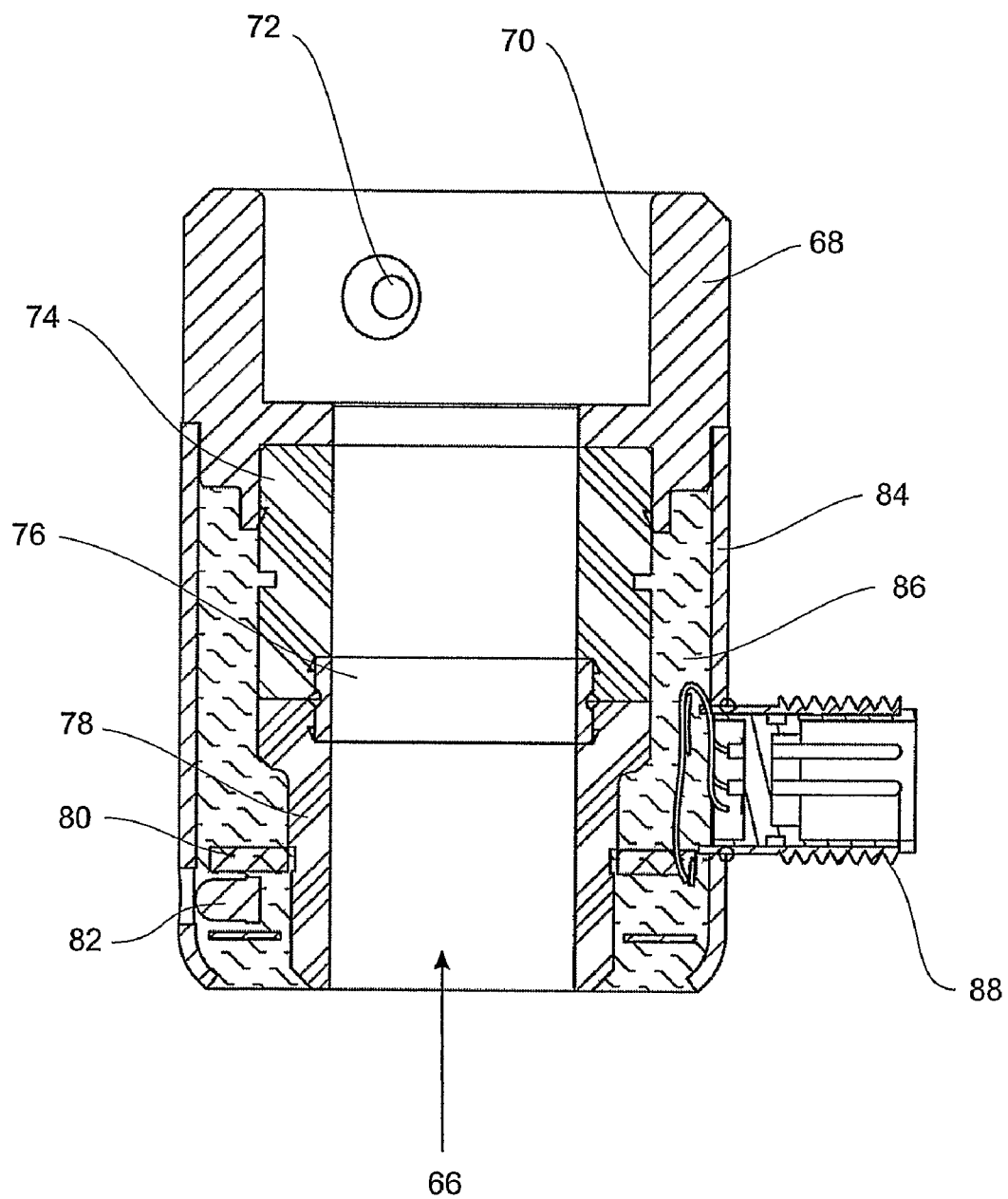
FIG. 2 shows a cross-sectional view of a flow sensor for use as part of the valve system of FIG. 1.

FIG. 1 shows an exterior view of the flow sensor 3 fitted to the lower end of the funnel 60. As is best appreciated from FIG. 2, which shows a cross-sectional view of the flow sensor, the flow sensor is generally cylindrical and has an axially aligned and cylindrical through-passage 66.

The sensor 3 has an upper base collar 68 with an upper cylindrical recess 70 by which the sensor is fitted to a cylindrical spout at the lower end of the funnel 60. A grub screw 72 fixes the collar about the spout. An upper electrically-insulating annular collar 74 is fitted into a lower cylindrical recess in the base collar 68. An annular conductive electrode 76 is fitted into a recess at the lower end of the first insulating collar 74. A lower electrically-insulating annular collar 78 is fitted to the lower end of the annular electrode. An annular circuit board 80 surrounds, and is carried by, the lower insulating collar. The circuit board is populated with electronic components, one of which is a light emitting diode (LED) 82 for providing a local indication for ease of problem location and fault finding purposes. A preferred arrangement, not shown, includes three equi-spaced LEDs to give a 360 degree visual indication at the sensor location.

A tubular stainless steel housing 84 is fitted to the lower end of the base collar to surround and thereby house the insulating collars, the electrode, the circuit board and the light emitting diode. The void between the insulating electrodes and the housing is filled with an electrically-insulating encapsulating material 86. A connector 88 mounted in the tubular housing 84 provides for external connection to the sensor circuitry for supplying electrical power to the sensor and for connecting a sensor output signal to a remote system. The innermost walls of the base collar 68, the upper and lower insulating collars, and the electrode are each circularly cylindrical and of substantially the same diameter. These walls together define the cylindrical through passage 66.

The base collar, the grub screw, the electrode and the housing are preferably made from a stainless steel, and in the preferred embodiment SS304 in the case of the base collar, the grub screw and the electrode, and SS316 in the case of the housing. Alternatively, these may be made of any other material that is suitable for use with the process and cleaning fluids being handled by the valve.

The upper and lower insulating collars are preferably made from a material that resists wetting by the process and cleaning fluids being handled by the valve. In the preferred embodiment, the insulating collars are made of a chemically inert and hydrophobic material, and preferably polytetrafluoroethylene (PTFE). The use of PTFE for the insulating collars reduces sensor sensitivity to conditions where moisture is present but there is no flow through the sensor.

When a sufficient flow of liquid flows down the wall of the through passage 66 and provides an electrically conductive bridge between the base collar as one sensor electrode and the annular electrode, the electronic circuitry provides an output signal indicative of this flow, at the connector 88. A local indication is also provided by the light emitting diode 82.

Thus the sensor provides a signal that is responsive to flow from the first leakage chamber, via the drainage bore 56, first leakage port 58 and funnel 60, through the passage 66 in the flow sensor.

The funnel 60 is provided with drainage apertures 89 for releasing excess flow that cannot readily pass through the sensor flow passage 66. It is to be understood that while the fluid passed by the valve may be a gas or a gas/liquid mixture, these may result in a flow of liquid through the sensor. For example, when steam is used to clean the valve, the flow at the sensor may be a condensate in liquid form.

The sensor output is connected from connector 88 via signal line 90 is to an input port of a valve control and monitoring system 91. The control and monitoring system provides control signals on respective control lines 92, 94, 96 for respective control ports 50, 52, 54 of the valve actuator 2 for setting the valve 1 to one or other of the valve configurations. In a typical application the control and monitoring system preferably includes a programmable logic controller (PLC), a Supervisory Control and Data Acquisition (SCADA) system, or any computer or microprocessor-based control and monitoring system.

The sensor output signal is compared by the control and monitoring system 91 with a signal representative of the control signals sent to command the valve actuator 2 for putting the valve 1 into a selected valve configuration. The control and monitoring system makes a comparison between the fluid flow through the sensor 3 as indicated by the sensor output signal, and a predetermined desired flow from the first leakage chamber 28 via port 58, associated with the selected valve configuration. The control and monitoring system then provides an output signal that is responsive to the comparison and is indicative of the presence or absence of a desired valve function or an undesired valve dysfunction. The output signal can be sent to a remote location for providing an indication of the presence or absence of a desired valve function or an undesired valve dysfunction to an operator. Alternatively, where the valve is part of a process plant, the plant process control system can be made responsive to the output signal that is indicative of the presence or absence of a desired valve function or an undesired valve dysfunction.

In a first example, when the valve is in the 'open' configuration, the predetermined desired flow from the first leakage chamber 28 to the sensor 3 as associated with this configuration is a zero flow as would be expected when there is no leakage past the third valve seal 42. If the sensor signal indicates a flow when the valve is in this configuration, the control and monitoring system provides an output signal indicating this as a valve dysfunction. Conversely, if the sensor signal indicates no flow when the valve is in this configuration, the control and monitoring system provides an output signal confirming the desired valve function.

In a second example, when the valve is in the quiescent 'closed' configuration, the predetermined desired flow from the first leakage chamber 28 to the sensor 3 as associated with this configuration is a zero flow as would be expected when there is no leakage past the main valve seals 24, 26. If the sensor signal indicates a flow when the valve is in this configuration, i.e. there is a leakage flowing from either of the first or second valve chambers 6, 8, past the respective first or second main seals 24, 26 and into the first leakage chamber 28, the control and monitoring system 91 provides an output signal indicating this as a valve dysfunction. Conversely, if the sensor signal indicates no flow when the valve is in this configuration, the control and monitoring system provides an output signal confirming the desired valve function.

In a third example, when the valve is in one of the 'cleaning' configurations, the predetermined desired flow from the first leakage chamber 28 to the sensor 3 as associated with these configurations is a significant fluid flow as would be expected when the cleaning fluid flowing through one of the valve chambers flows past the unseated main valve seal. If the sensor signal indicates a flow when the valve is in this configuration, the control and monitoring system provides an output signal confirming a desired valve function. Conversely, if the sensor signal indicates no flow when the valve is in this configuration, the control and monitoring system provides an output signal indicating this lack of expected cleaning fluid flow as a valve dysfunction.

The scope of leakage and flow monitoring provided by the system described can be readily extended as will now be described. A fluid flow conduit 100, connected to a leakage port 102 leading from the second leakage chamber 34, is connected to a port 104 leading to the interior of the funnel 60. In this way, leakage past the upper body seal 30 into the second leakage chamber 34 flows into the funnel 60 and thus down through the flow sensor 3. Similarly, a fluid flow conduit 106, connected to a leakage port 108 leading from the second leakage chamber 40, is connected to the port 104 leading to the interior of the funnel 60. In this way, leakage past the lower body seal 36 into the second leakage chamber 40 flows into the funnel 60 and thus down through the flow sensor 3. The conduits 100, 106 may be connected together and thus to a common port 104 leading to the interior of the funnel as described above and as shown in FIG. 1, or may be coupled independently to respective ports. With these additional conduits, leakage from either of the first or second valve chambers 6, 8, past respective body seals 30, 36 into respective second and third leakage chambers 34, 40, is detected by the sensor 3.

It will be appreciated that the valve monitoring described above can provide indications of a plurality of valve conditions using a single flow sensor. It is also to be noted that, for convenience of illustration, FIG. 1 shows the port 104 directly above one of the drainage apertures 89. However, in practice a drainage aperture will not be located directly below the port 104 so that liquid flow introduced into the funnel at port 104 will flow down the inside funnel wall and through the passage 66 of the sensor 3.

Although some ambiguity may arise as to the cause of a flow at the sensor in any one valve configuration, at least in some cases this may be resolved by waiting until the valve is put into one or more further valve configurations and correlating the presence of the flow at the sensor with the further configuration(s). In some circumstances any ambiguity may be resolved by correlation of the detected flow at the sensor with the known presence and pressure of fluids at particular valve chambers for particular valve configurations.

Even with some ambiguity, the system is useful as it can be used to confirm correct flows of clean-in-place fluids when the valve is in a 'cleaning' configuration and to confirm the absence of leakage past seated seals in 'open' and 'closed' configuration. An early indication of seal or system failure can therefore be provided. Furthermore, and in contrast to the known visual indication at the valve (e.g. as provided by the discharge of the flow from the first leakage port 58), the indication provided by the valve system described above and shown in FIG. 1 can be relayed to a remote monitoring location and used to modify the control of the process in which the valve system is serving.

It is to be understood that the invention is not limited to the particular valve topology described above, which is given as one preferred embodiment by way of example only. The combination of flow sensor and double seal valve can be applied to other double seal valve topologies without departing from the scope of the invention. For example, the invention can be applied to a double seal valve in which both valve plungers are actuated from below. Such valves are typically used to control input and/or output flows at the bottom of a tank or similar vessel.

One application of the preferred embodiment of the invention is in association with hygienic mix-proof (i.e. double seal) valves used in processing foods, for example processing milk products, where the early warning of seal failure and confirmation of correct cleaning is of paramount importance in avoiding any risk of contamination by intermixing between food materials and cleaning fluids or by harbouring bacteria or other pathogens.

Although the preferred embodiment has been described with reference to a conductivity sensor, other sensor arrangements that provide a signal indicative of the presence or absence of a flow can be used, and may be preferable in cases where the flow has insufficient electrical conductivity to make the flow easily detected by the sensor described above. For example, an alternative sensor may employ a capacitive technique where the flow is passed as a dielectric between capacitor plates in the sensor.

The term 'comprising' as used in this specification and claims means 'consisting at least in part of', that is to say when interpreting statements in this specification and claims which include that term, the features, prefaced by that term in each statement, all need to be present but other features can also be present.

LIST OF FEATURES LABELLED IN THE FIGURES valve 1
valve actuator 2
sensor 3
valve body 4
upper (first) valve chamber 6
lower (second) valve chamber 8
upper valve chamber left side port 10
upper valve chamber right side port 12
lower valve chamber left side port 14
lower valve chamber right side port 16
intermediate passage 18
first valve plunger 20
second valve plunger 22
lower (first) main seal 24
upper (second) main seal 26
first leakage chamber 28
upper body seals 30, 32
second leakage chamber 34
lower body seals 36, 38
third leakage chamber 40
third main seal 42
lower end face (of first plunger) 44
upward facing shoulder (of second plunger) 46
first control port 50
second control port 52
second control port 54
waist 55
drainage bore 56
first leakage port 58
funnel 60
circumferential ridge 62
clamp 64
through passage 66
base collar 68
upper cylindrical recess 70
grub screw 72
first insulating annular collar 74
electrode 76
second insulating annular collar 78
circuit board 80
light emitting diode 82
housing 84
encapsulating material 86
connector 88
drainage apertures 89
signal line 90
control and monitoring system 91
actuator control lines 92, 94, 96
conduit 100
second leakage port 102
funnel port 104
conduit 106
third leakage port 108

We claim:

1. A valve apparatus comprising:
   a valve having a valve body with first and second valve chambers connected to respective valve ports and joined by an intermediate passage, the valve being selectively configurable in: i) a first open configuration in which the intermediate passage is open and the first and second valve chambers are interconnected by the intermediate passage, ii) a second closed configuration in which the intermediate passage is closed by first and second seals seated at respective locations in the passage to seal respectively between the first and second valve chambers and a first leakage chamber at the portion of the intermediate passage between the two seals, or iii) a third cleaning configuration in which one of the two seals is unseated to connect a respective one of the first and second valve chambers to the first leakage chamber, while the other of the two seals remains seated;
   a valve actuator adapted for selectively setting the valve to any one of the three configurations in response to respective control signals
   a flow sensor connected to the first leakage chamber and adapted to provide a flow sensor output signal that is indicative of a leakage flow from the first leakage chamber; and
   a valve controller having at least one signal input port to which the flow sensor output signal is connected, wherein the valve controller is adapted to: provide at least one control signal to the valve actuator for setting the valve to a respective one of the three configurations, respond to the flow sensor output signal and make a comparison between the leakage flow as indicated by the flow sensor output signal and a predetermined flow from the first leakage chamber associated with the selected valve configuration, and provide a controller output signal that is responsive to the comparison and is indicative of the presence or absence of a desired valve function or an undesired valve dysfunction.

2. The valve apparatus as claimed in claim 1, wherein the controller output signal is indicative of an undesired valve dysfunction when the valve is in the second closed configuration, the dysfunction being a leakage flowing from either of the first or second valve chambers, past the respective first or second seals and into the first leakage chamber.

3. The valve apparatus as claimed in claim 1, wherein the controller output signal is indicative of a desired valve function when the valve is in the third cleaning configuration, the desired valve function being a flow past the unseated seal from a respective valve chamber into the first leakage chamber.

4. The valve apparatus as claimed in claim 1, wherein the valve has a third seal located between the first and second seals, the third seal being for sealing the first leakage chamber from the interconnected valve chambers and the interconnecting passage when the valve is in the first open configuration.

5. The valve apparatus as claimed in claim 4, wherein the controller output signal is indicative of an undesired valve dysfunction when the valve is in the first open configuration, and the dysfunction is a leakage flowing past the third seal and into the first leakage chamber, from the interconnected first and second valve chambers and the interconnecting passage.

6. The valve apparatus as claimed in claim 1, wherein the first and second seals are mounted on respective first and second valve members; the first and second valve members are independently moveable relative to the valve body to effect the selected valve configuration; the valve apparatus further comprising: a second leakage chamber between the first valve member and the body; a fourth seal for sealing between the first valve member and the valve body, the fourth seal being located between the first valve chamber and the second leakage chamber; a third leakage chamber between the second valve member and the valve body; a fifth seal for sealing between the second valve member and the valve body, the fifth seal being located between the second valve chamber and the third leakage chamber; and the second and third leakage chambers are connected to the flow sensor so that leakage flowing past the fourth seal and into the second leakage chamber, or past the fifth seal and into the third leakage chamber, is directed to the flow sensor so that the flow sensor output signal can also be indicative of leakage flow past either of the fourth or fifth seals.

7. The valve apparatus as claimed in claim 6, wherein the controller output signal is indicative of an undesired valve dysfunction when the valve is in the first open configuration or the second closed configuration, and the dysfunction is a leakage flowing from the first valve chamber and past the fourth seal into the second leakage chamber, or a leakage flowing from the second valve chamber and past the fifth seal into the third leakage chamber.

8. The valve apparatus as claimed in claim 1, wherein the flow sensor has a tubular passage and a pair of annular electrodes mounted coaxially with, and spaced apart along, an electrically insulative wall of the tubular passage, the flow sensor being connected to the first leakage chamber so that the leakage flow from the first leakage chamber flows through the tubular passage and across the electrodes to provide an electrically conductive path therebetween.

9. A method of monitoring the status of a controlled valve having a valve body and first and second valve chambers connected to respective valve ports and joined by an intermediate passage, the valve being selectively configurable in: i) a first 'open' configuration in which the intermediate passage is open and the first and second valve chambers are interconnected by the intermediate passage, ii) a second closed configuration in which the intermediate passage is closed by first and second seals seated at respective locations in the passage to seal respectively between the first and second valve chambers and a first leakage chamber at the portion of the intermediate passage between the two seals, or iii) a third cleaning configuration in which one of the two seals is unseated to connect a respective one of the first and second valve chambers to the first leakage chamber, while the other of the two seals remains seated, the method comprising the steps of: (a) connecting a flow sensor to the first leakage chamber, the flow sensor thereby providing an output signal that is indicative of a leakage flow from the first leakage chamber; (b) receiving a valve control signal and selectively setting the valve to one or other of the three configurations in response to the received control signal; (c) comparing the leakage flow as indicated by the sensor output signal with a predetermined flow from the first leakage chamber associated with the selected valve configuration, and (d) providing a comparison output signal that is responsive to the comparison and is indicative of the presence or absence of a desired valve function or an undesired valve dysfunction.

10. A method of monitoring as claimed in claim 9, wherein the comparison output signal provided in step (d) is indicative of an undesired valve dysfunction when the valve is in the second closed configuration, the dysfunction being a leakage flowing from either of the first or second valve chambers, past the respective first or second seals and into the first leakage chamber.

11. A method of monitoring as claimed in claim 9, wherein the comparison output signal provided in step (d) is indicative of a desired valve function when the valve is in the third cleaning configuration, the desired valve function being a flow past the unseated seal from a respective valve chamber into the first leakage chamber.

12. A method of monitoring as claimed in claim 9, wherein the valve has a third seal located between the first and second seals, the third seal being for sealing the first leakage chamber from the interconnected valve chambers and the interconnecting passage when the valve is in the first open configuration.

13. A method of monitoring as claimed in claim 12, wherein the comparison output signal provided by the valve controller is indicative of an undesired valve dysfunction when the valve is in the first open configuration, and the dysfunction is a leakage flowing past the third seal and into the first leakage chamber, from the interconnected first and second valve chambers and the interconnecting passage.

14. A method of monitoring as claimed in claim 9, wherein the first and second seals are mounted on respective first and second valve members; the first and second valve members are independently moveable relative to the valve body to effect the selected valve configuration; the valve further comprising: a second leakage chamber between the first valve member and the body; a fourth seal for sealing between the first valve member and the valve body, the fourth seal being located between the first valve chamber and the second leakage chamber; a third leakage chamber between the second valve member and the valve body; and a fifth seal for sealing between the second valve member and the valve body, the fifth seal being located between the second valve chamber and the third leakage chamber; and the second and third leakage chambers are connected to the flow sensor so that leakage flowing past the fourth seal and into the second leakage chamber, or past the fifth seal and into the third leakage chamber, is directed to the flow sensor so that the flow sensor output signal can also be indicative of leakage flow past either of the fourth or fifth seals.

15. A method of monitoring as claimed in claim 14, wherein the comparison output signal is indicative of an undesired valve dysfunction when the valve is in the first open configuration or the second closed configuration, and the dysfunction is a leakage flowing from the first valve chamber and past the fourth seal into the second leakage chamber, or a leakage flowing from the second valve chamber and past the fifth seal into the third leakage chamber.

16. A method of monitoring as claimed in claim 9, wherein the flow sensor has a tubular passage and a pair of annular electrodes mounted coaxially with, and spaced apart along, an electrically insulative wall of the tubular passage, and the flow sensor is connected to the first leakage chamber so that leakage flow from the first leakage chamber flows through the tubular passage and across the electrodes to provide an electrically conductive path therebetween.

17. A valve apparatus comprising:
   a valve having a valve body with first and second valve chambers connected to respective valve ports and joined by an intermediate passage, the valve being selectively configurable in: i) a first open configuration in which the intermediate passage is open and the first and second valve chambers are interconnected by the intermediate passage, ii) a second closed configuration in which the intermediate passage is closed by first and second seals seated at respective locations in the passage to seal respectively between the first and second valve chambers and a first leakage chamber at the portion of the intermediate passage between the two seals, or iii) a third cleaning configuration in which one of the two seals is unseated to connect a respective one of the first and second valve chambers to the first leakage chamber, while the other of the two seals remains seated;
   a valve actuator adapted for selectively setting the valve to any one of the three configurations in response to respective control signals;

a flow sensor connected to the first leakage chamber and adapted to provide a flow sensor output signal that is indicative of a leakage flow from the first leakage chamber;

first and second valve members, said first and second seals mounted on respective first and second valve members wherein said first and second valve members are independently moveable relative to the valve body to effect the selected valve configuration;

a second leakage chamber disposed between the first valve member and the body;

a fourth seal for sealing between the first valve member and the valve body, the fourth seal being located between the first valve chamber and the second leakage chamber;

a third leakage chamber disposed between the second valve member and the valve body;

a fifth seal for sealing between the second valve member and the valve body, the fifth seal being located between the second valve chamber and the third leakage chamber such that the second and third leakage chambers are connected to the flow sensor so that leakage flowing past the fourth seal and into the second leakage chamber, or past the fifth seal and into the third leakage chamber, is directed to the flow sensor so that the flow sensor output signal can also be indicative of leakage flow past either of the fourth or fifth seals.

18. The valve apparatus as claimed in claim 17, wherein the controller output signal is indicative of an undesired valve dysfunction when the valve is in the first open configuration or the second closed configuration, and the dysfunction is a leakage flowing from the first valve chamber and past the fourth seal into the second leakage chamber, or a leakage flowing from the second valve chamber and past the fifth seal into the third leakage chamber.

* * * * *